Figure 3:
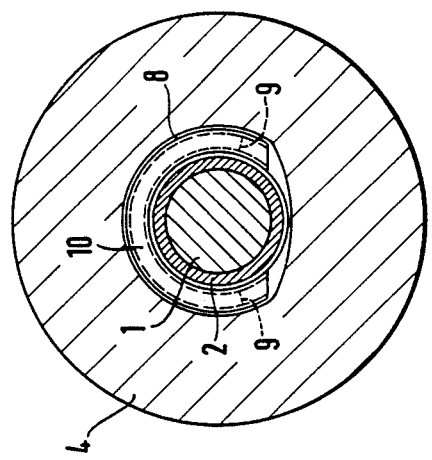

United States Patent [19]

Henriksson et al.

[11] Patent Number: 4,795,273
[45] Date of Patent: Jan. 3, 1989

[54] PROPELLER SHAFT BEARING ARRANGEMENT

[75] Inventors: Torbjörn Henriksson, Helsinki; Kari Laukia, Espoo; Heikki Sipilä, Turku; Markus Hjerppe, Vaasa, all of Finland

[73] Assignee: Oy Wärtsilä Ab, Helsinki, Finland

[21] Appl. No.: 122,894

[22] Filed: Nov. 19, 1987

Related U.S. Application Data

[62] Division of Ser. No. 22,257, Mar. 3, 1987, Pat. No. 4,733,976.

[51] Int. Cl.$^4$ ............ F10C 3/00; F16C 33/72; F01M 9/00; B63H 1/15
[52] U.S. Cl. .................. 384/97; 184/6.21; 184/6.23; 184/109; 277/1; 277/DIG. 9; 384/322; 384/397; 384/904; 416/174; 416/244 B
[58] Field of Search ............ 384/97, 98, 904, 130, 384/141, 322, 397–401; 415/111, 113, 170 A, 119; 416/244 B, 244 R, 174 R, 500; 184/109, 6.21, 6.23; 277/1, DIG. 9

[56] References Cited

U.S. PATENT DOCUMENTS

| | | | |
|---|---|---|---|
| 2,719,762 | 10/1955 | Weaver | 384/97 |
| 3,749,764 | 7/1973 | Satterthwaite | 384/130 |
| 3,955,646 | 5/1976 | Leubkemann | 184/109 |
| 4,381,127 | 4/1983 | Visser | 384/399 |

Primary Examiner—Stuart S. Levy
Assistant Examiner—Thomas R. Hannon
Attorney, Agent, or Firm—Dellett, Smith-Hill & Bedell

[57] ABSTRACT

The invention relates to a method for preventing leaks in a propeller shaft bearing arrangement including a plain bearing (2), which is lubricated with oil or water and which supports the propeller shaft (1) extending through an opening in the body (4) of a hull, and packing members (6,7) for keeping the lubricant in the lubrication space and for preventing water from entering the bearing arrangement. According to the invention, the pressure vibrations occuring in the lubricant are equalized arranging, in the lubrication space, a medium possessing a high compressibility, which medium by means of changes in volume receives and equalizes said pressure vibrations.

4 Claims, 3 Drawing Sheets

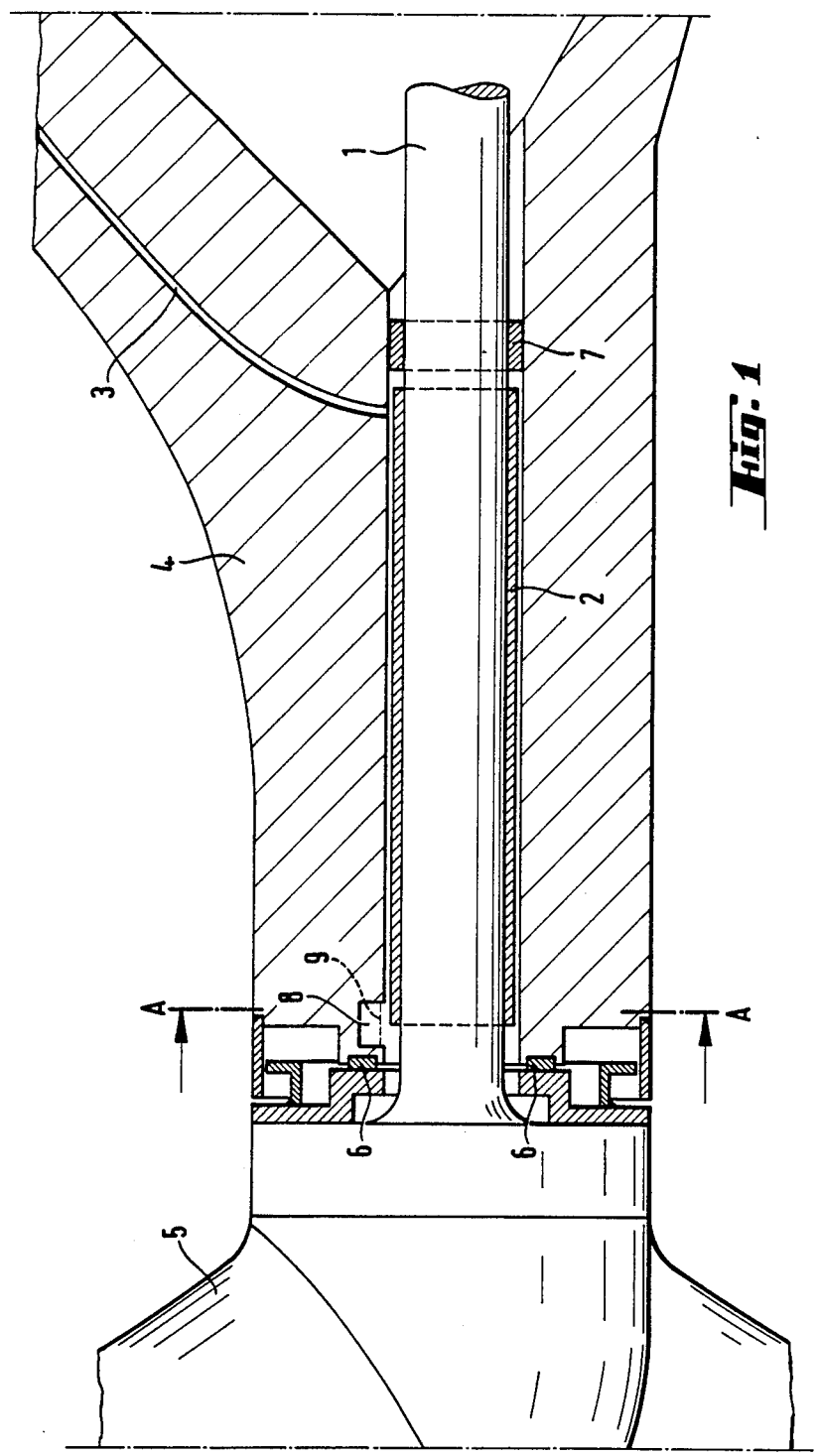

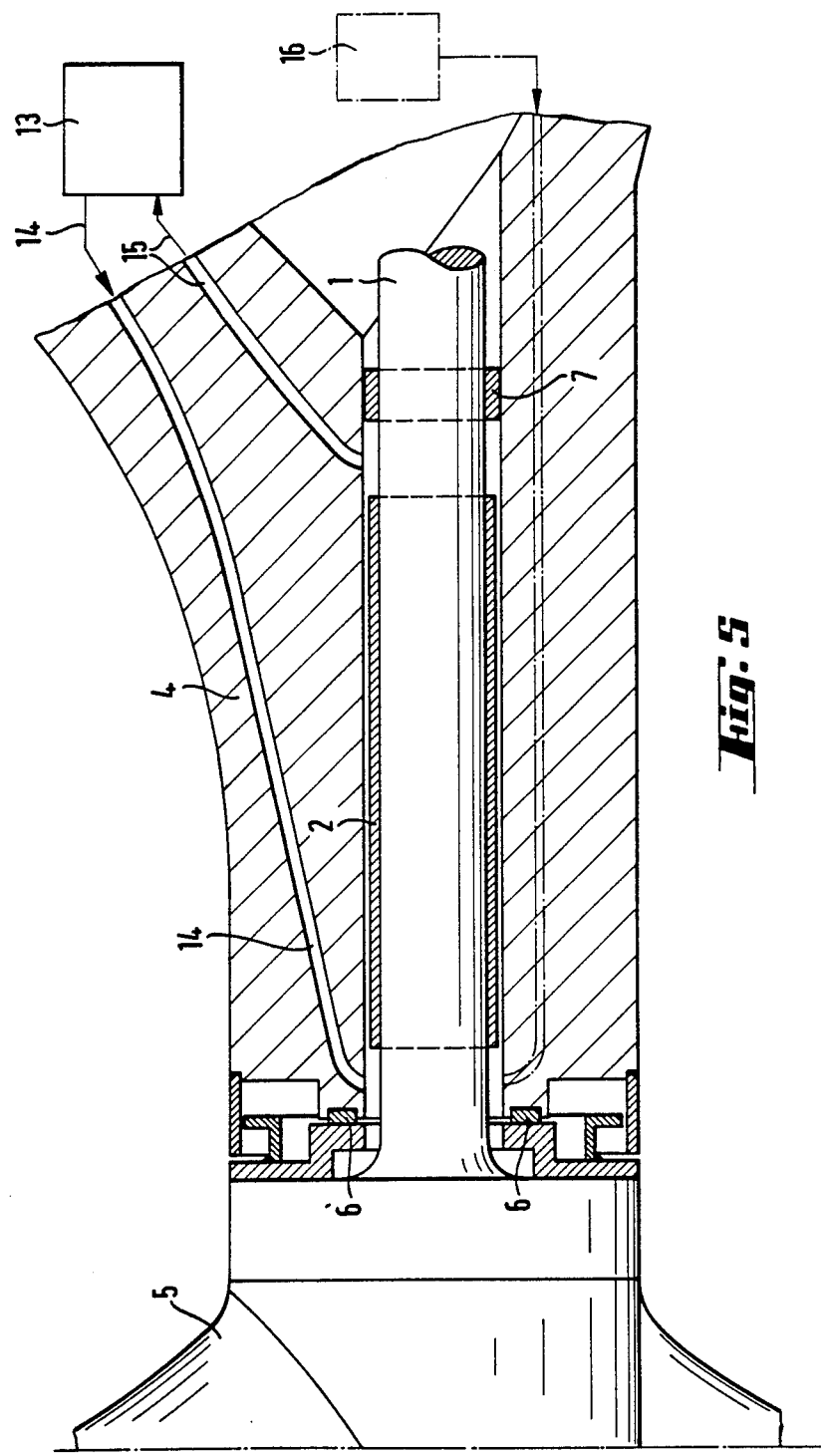

PROPELLER SHAFT BEARING ARRANGEMENT

This application is a divisional application of Ser. No. 022,257 filed Mar. 3, 1987, now U.S. Pat. No. 4,733,976.

The invention relates to a bearing arrangement for a propeller shaft.

A bearing arrangement in the shaft tube of a ship propeller normally includes a plain bearing, which supports the propeller shaft. Both oil and water have been used as a lubricant for the plain bearing. A problem with oil lubrication is provision of a tight packing system. Leaks of oil into the environment have to be avoided even from the viewpoint of conservation of nature, on the other hand penetration of salty sea water into a bearing system easily causes a corrosive effect in bearing elements that have not been manufactured to endure the oxidizing effect of salt water. On the other hand a bearing system based on oil lubrication is considerably more advantageous from the viewpoint of costs than a water lubrication system, as cheaper materials can then be selected to be used as bearing material.

In order to tighten an oil lubricated bearing various elastic ring packings or metal packings have been used between the stationary element and the rotating element. Generally the lubricant in the shaft tube is via ducts connected with a lubricant tank positioned at a higher altitude and hereby providing a hydrostatic pressure that lessens water leaks to the inside. In normal conditions, when travelling in warm waters, it is possible to provide, by means of conventional arrangements, a satisfactory tightening in this way. When travelling in icy waters, however, it is more difficult to control the tightening. Because of cold the viscosity of lubrication oil increases, whereby the vibrations in oil pressure in the shaft tube are slowly transmitted into the oil tank, which serves as an expansion chamber. Additionally it has proved that rather high pressure vibrations with high pressure peaks occur in the tube for the propeller shaft of a vessel travelling in icy waters. A foremost reason for this phenomenon are the shock-like movements transmitted to the propeller shaft when the propeller hits ice blocks. Recurring under- and over-pressures then tend to burst out through the packings so that oil leaks into the environment and sea water enters the bearing system.

In addition the problems with oil lubrication are aggravated in arctic conditions, in which damages to nature as a result of a possible oil leak are multiplied. For this reason oil lubricated bearings have not been considered adaptable e.g. in arctic river ice-breakers, but it has instead been a necessity to utilize the more expensive water lubrication system.

An object for the invention is to create a novel bearing arrangement, in which pressure changes occuring in the lubricant of propeller shafts are equalized in a simple and economical way. An object for the invention is additionally to accomplish a bearing arrangement based on oil lubrication and which is particularly well adapted for propeller shafts of vessels intended for operation in icy waters.

According to the invention an equalizer arrangement for pressure vibrations is provided in connection with the packing systems of the propeller shaft. The arrangement comprises either a pneumatically operated equalizer, or an equalizer comprising some elastically compressible material, which equalizer in an advantageous embodiment is installed within the tube for the propeller shaft in the immediate vicinity of the packing to be protected.

In practice this means arranging a gas pocket, receiving and equalizing pressure vibrations, to communicate with the lubricant at the position, in which sudden and high pressure peaks would otherwise hinder the packing from functioning properly. The ability of a gaseous medium, for instance air, to react quickly and almost frictionless to pressure variation with a change volume of a corresponding magnitude therey creates a desired equalization of pressure in the lubricant.

The pneumatic or elastic medium can with advantage be located in a depression in the tube for the propeller shaft so, that the medium maintains its position by means of an elastic membrane covering the opening of the depression. In accordance with another alternative a member, for instance a tube shaped like a horseshoe, is installed in the lubrication space in the vicinity of the packing, which member encloses a gas pocket. According to a third embodiment gas pockets are installed in a depression within the tube for the propeller shaft in pockets of elastic material, or alternatively pieces of elastic materials may correspondingly be attached to the tube. An advantage with this embodiment is a large connection surface of the equalizing medium with the lubricant, which is apt to create more effective equalization for pressure vibrations and at the occurence of less friction work. According to a fourth embodiment, the pneumatic equalizing is based on a continuous feeding of gas bubbles into the lubricant, either in connection with a circulation system of the lubricant, or by means of a separate source of compressed gas in connection with the shaft tube.

In the following the invention is described more in detail with reference to the attached drawing, in which FIG. 1 shows schematically a bearing arrangement according to the invention, partly in section and viewed from the side.

Figure 4:
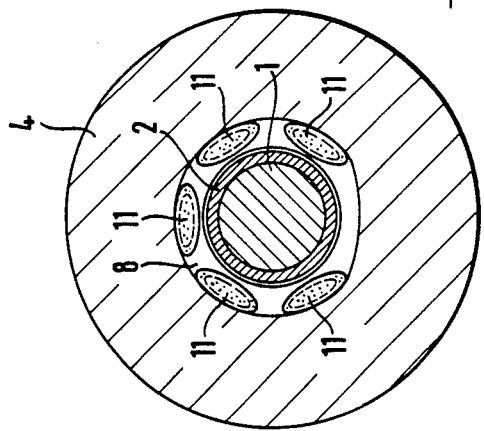
Figure 2:
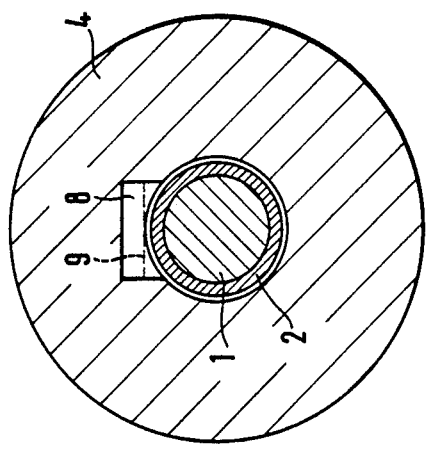

FIG. 2 shows an embodiment of the invention in section according to plane A—A of FIG. 1, FIG. 3 shows another embodiment of the invention in section according to plane A—A of FIG. 1, FIG. 4 shows a third embodiment of the invention in section according to plane A—A of FIG. 1, and FIG. 5 shows schematically a fourth embodiment of the invention, partly in section and viewed from the side.

In the drawing reference 1 means a propeller shaft, to the outer end of which a propeller 5 is attached. Reference 4 means the stern body of a hull. A plain bearing 2 is installed between the stern part of the hull 4 and the propeller shaft 1. As a lubricant for the bearing there is oil, which is supplied into the lubricant space through a duct connection 3 from a lubricant tank located more above. Thus, the lubricant space between the propeller shaft 1 and the stern part of the hull 4 is under hydrostatic pressure, which is sufficient so as to secure formation of an appropriate oil membrane between the moving parts. Packing member 17 and metallic rear packing 6 secure that the oil does not escape from the lubricant space. The packing member 7 is with advantage a conventional ring packing, and the metal packing 6 is advantageously composed of soft white metal which forms a sliding surface between the stationary hull 4 and the rotating propeller 5. The bearing arrangement according to FIG. 1 does not comprise a separate cooling system or a circulating system for the lubricant. Existence of such systems is naturally possible within the scope of the invention.

A depression 8 is arranged in the lubricant space, close to packing 6. According to the embodiment of FIG. 2 this depression is provided with an air pocket, the lower surface of which is depicted with a broken line 9. An elastic membrane, placed at the position of the broken line 9 and closing the opening of the depression 8, promotes favourably keeping the air pocket in its place.

In the embodiment according to FIG. 3 a horseshoe shaped tube 10 is installed in the depression 8, which tube includes an air pocket above the broken line 9. In this embodiment the air pocket keeps in its position due to the interaction between the air and the liquid-like lubricant.

In the embodiment of FIG. 4 a number of elastic pocket members 11 are installed in the depression 8, which members are made of elastic material, favourably of nitride rubber, and filled with air. The pocket members are fixed to the stern part of the hull 4. Pocket members 11 may alternatively consist of a suitable flexible material so, that the pockets are only partly filled with gas. According to another embodiment, the pocket members 11 consist of a compact material possessing a high compressibility.

In the embodiment of FIG. 5, there is used a circulation system for the lubricant. Reference 13 relates generally to the pump device, including a lubricant tank and possibly also cooling means. The pump device 13 delivers lubricant to the shaft tube through inlet 14, and the oil is passed from the tube via outlet 15. Hereby the pump device mixes or diffuse small gas bubbles into the lubricant that is fed to the shaft tube, in a manner well known as such. Alternatively or additionally, there may be used a separate source for feeding gas directly to the tube, for instance a compressor 16. The gas should hereby be fed to the shaft tube very close to the packing which is to be protected. When utilizing a separate compressor 16 in connection with a lubricant circulation system, the outflow of lubricant should preferably be arranged at the same end of the shaft as the gas feeding means, according to FIG. 5 pipe 14 transmits hereby lubricant from the shaft tube to the pump device 13.

In all the embodiments the operation takes place correspondingly. Due to shock-like movements of the propeller shaft pressure vibration occurs in the lubricant. The gas pockets, gas bubbles or the compressible material arranged in connection with the lubricant automatically equalize these pressure vibrations by means of volume changes of the gas or the material, and the under- and overpressures otherwise occuring in the lubricant do not burst out through the packing members 6 and 7.

The drawing discloses installation of one pressure equalizing system in the vicinity of the metal packing 6. Within the scope of the invention it is essential that the pressure equalizer is installed as close to the packing member as possible, because a greater distance also decreases the efficiency of the pressure equalizer as a result of the internal friction of the lubricant. Naturally it is possible to arrange another similar pressure equalizing system in connection with the packing member 7, although this measure is more rarely necessary.

The invention is not limited to the embodiment shown but several modifications of the invention are feasible within the scope of the attached claims. For example, the invented system may also be applied to water lubricant systems. The gas medium may be air, or such a gas, the bigger molecular mass of which ensures a better keeping in the pocket elements. No depression 8 is needed, if there otherwise is provided enough space for the equalizer in the vicinity of the packing. There may also be used separate depressions 8 for each equalizer.

We claim:

1. A propeller shaft bearing arrangement comprising a hull body formed with an elongate passage, a propeller shaft extending through the elongate passage, a plain bearing which supports the propeller shaft, packing members for preventing liquid from entering or leaving the passage by way of the ends thereof, and means for delivering liquid lubricant to the passage for lubricating the plain bearing, the means for delivering liquid lubricant being operative to suspend gas bubbles in the liquid lubricant.

2. A propeller shaft bearing arrangement, which arrangement includes a plain bearing, which is lubricated with oil or water and which supports the propeller shaft extending through an opening in the body of a hull, and packing members for keeping the lubricant in the lubrication space and for preventing water from entering the bearing arrangement, which arrangement further comprises a circulation system for the lubricant, in connection to which system there is mixed gas bubbles into the lubricant, which gas bubbles act as said equalizers.

3. A bearing arrangement according to claim 1, in which the pump device of said circulation system comprise means which mix gas bubbles into the lubricant.

4. A bearing arrangement according to claim 1, in which the feeding of gas bubbles into the lubricant is accomplished by means of a separate source of compressed gas, which source preferably feeds gas to the lubrication space in the vicinity of the packing member to be protected.

* * * * *